United States Patent [19]
Breeden, Jr. et al.

[11] Patent Number: 4,934,634
[45] Date of Patent: * Jun. 19, 1990

[54] PIPE HANGER

[75] Inventors: Winston H. Breeden, Jr., Westlake; Edward S. Kennedy; Phillip A. Wright, both of Strongsville, all of Ohio

[73] Assignee: Wire Products Co., Inc., Cleveland, Ohio

[*] Notice: The portion of the term of this patent subsequent to Jan. 3, 2006 has been disclaimed.

[21] Appl. No.: 254,418

[22] Filed: Oct. 6, 1988

Related U.S. Application Data

[63] Continuation of Ser. No. 865,678, May 22, 1986, Pat. No. 4,795,115.

[51] Int. Cl.$^5$ .............................................. F16L 3/00
[52] U.S. Cl. ..................................... 248/59; 248/62; 248/74.1
[58] Field of Search ............ 248/58, 59, 62, 68.1, 248/74.1, 65, 327, 315, 175, 302, 317; 24/27; 362/358

[56] References Cited

U.S. PATENT DOCUMENTS

| | | |
|---|---|---|
| 545,775 | 9/1895 | Clark . |
| 702,704 | 6/1902 | Carll . |
| 851,505 | 4/1907 | Ernst . |
| 911,583 | 2/1909 | Focht . |
| 926,274 | 6/1909 | Meneray . |
| 971,077 | 9/1910 | Roberts . |
| 1,001,180 | 8/1911 | Syne . |
| 1,359,388 | 11/1920 | Koerner . |
| 1,579,418 | 4/1926 | Tomkinson . |
| 1,579,419 | 4/1926 | Tomkinson . |
| 2,762,592 | 9/1956 | Adams, Jr. . |
| 2,957,217 | 10/1960 | Mortorelli . |
| 2,996,274 | 8/1961 | Marik et al. . |
| 3,008,206 | 11/1961 | Meese et al. . |
| 3,132,396 | 5/1964 | Berman . |
| 3,171,624 | 3/1965 | Leahy . |
| 3,261,580 | 7/1966 | Schauster . |
| 4,060,008 | 11/1977 | Wilkinson . |
| 4,099,298 | 7/1978 | Gimenez . |
| 4,127,921 | 12/1978 | Townsend . |
| 4,166,600 | 9/1979 | Perjes . |
| 4,305,557 | 12/1981 | Kowalski . |
| 4,306,696 | 12/1981 | Pondman . |
| 4,440,369 | 4/1984 | Banks . |
| 4,476,616 | 10/1984 | Jensen . |

FOREIGN PATENT DOCUMENTS

| | | |
|---|---|---|
| 238169 | 3/1962 | Australia . |
| 2309664 | 3/1973 | Fed. Rep. of Germany . |

Primary Examiner—David L. Talbott
Attorney, Agent, or Firm—Fay, Sharpe, Beall, Fagan, Minnich & McKee

[57] ABSTRACT

A pipe hanger assembly for suspension from an associated spacing member extending from a support structure. The hanger assembly includes a generally continuous loop member configured to receive an associated pipe therein. Extending legs on the loop member each include first and second arcuate portions defining interlocking means. The interlocking means are designed to engage an opposed leg and receive an interconnecting member therethrough. The interconnecting member operatively engages the spacing member and has a radially extending flange defining a shoulder for abutting engagement with the loop member.

16 Claims, 1 Drawing Sheet

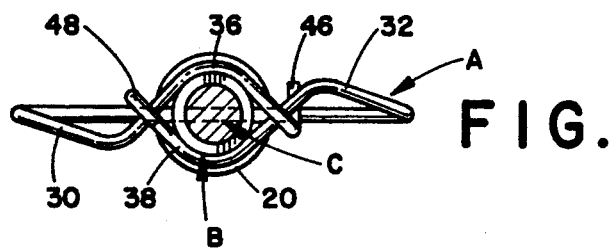
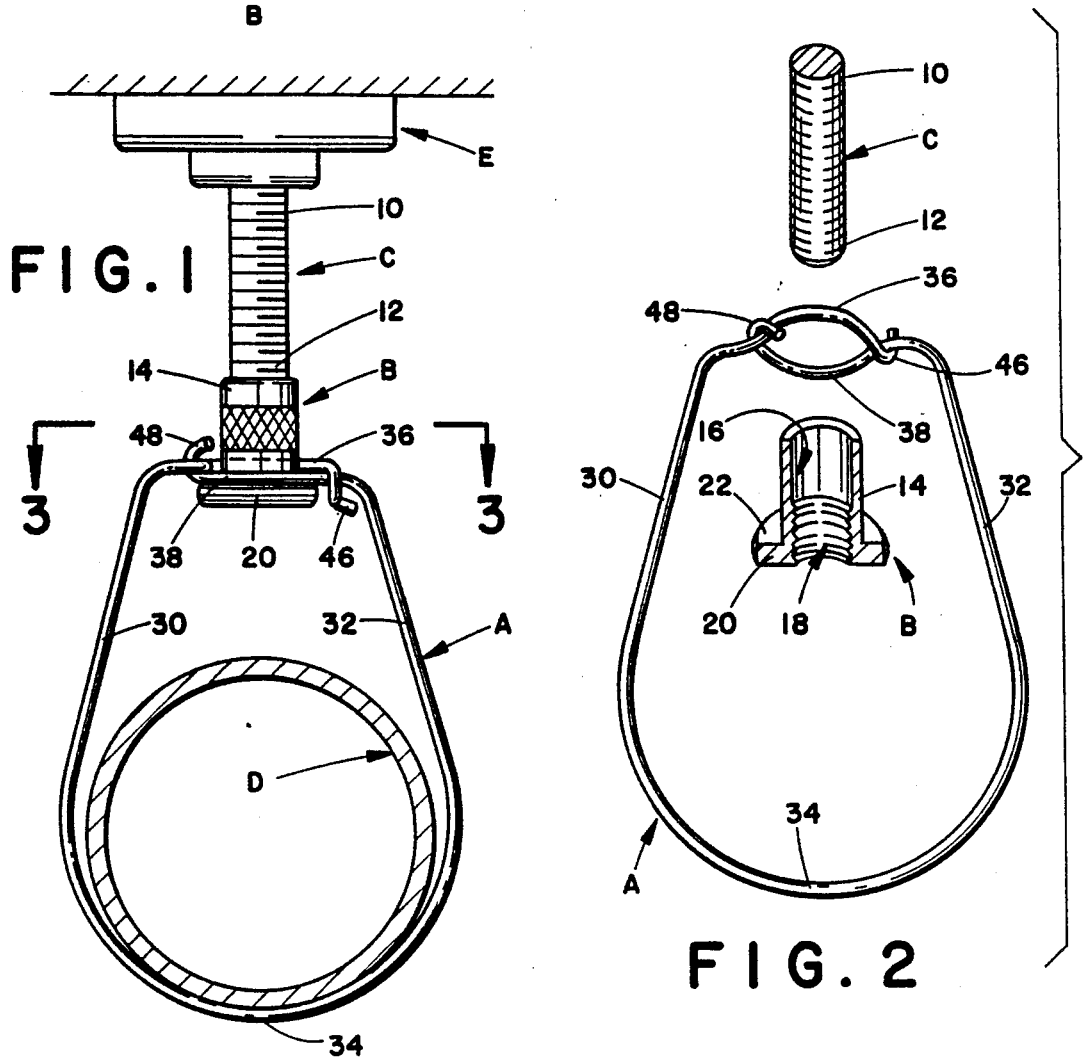
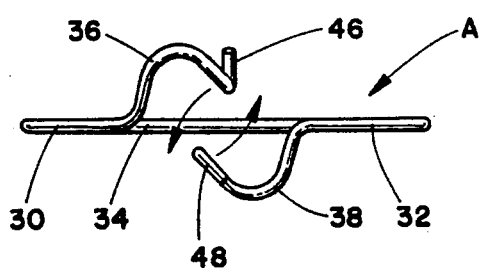

PIPE HANGER

This is a continuation of application Ser. No. 865,678, filed May 22, 1986 now U.S. Pat. No. 4,795,115.

BACKGROUND OF THE INVENTION

This invention pertains to the art of devices for hanging pipes or the like and more particularly to self-locking pipe hangers. The invention is particularly applicable to a unitary bent member and will be described with particular reference thereto. However, it will be appreciated that the invention has broader applications and may be advantageously employed in other environments and applications.

Pipe hangers of the type to which this invention pertain have ordinarily included a pair of separate, cooperating members designed to support an associated pipe along a predetermined circumferential portion. The cooperating portions are interlocked at two separate regions, one at a region disposed beneath the pipe and the second region at an area spaced therefrom, usually above the pipe, U.S. Pat. No. 2,996,274 to Marik, et al. issued Aug. 15, 1961 is exemplary of this type of structure.

The pipe hanger shown in U.S. Pat. No. 4,440,369 to Banks issued Apr. 3, 1984 illustrates a wire-type structure that cooperates with a separate member at outer ends of separate leg portions. Wire structures incorporated into a pipe hanger assembly have necessarily required a separate member for attaching the outer leg portions or have relied on deformation of the wire member to lockingly engage the support structure. The small cross-sectional area of the wire structures has prevented application of the locking or retaining structure of the band-like hangers to the wire. For example, U.S. Pat. No. 3,261,580 issued to Schauster on Jul. 19, 1966 show a generally U-shaped band member in which outer leg portions cooperate with a separate nut member to support a pipe from a hanger rod or stud. On the other hand, the band-like hangers are more expensive due to the amount of stock material required to form the band.

Although these prior art devices have met with some success, it still remains a primary concern that the pipes are reliably supported and remain supported for many years. Further, it has been considered desirable to design the pipe hanger so that it is relatively inexpensive to manufacture and efficiently installed in order to reduce overall costs. The pipe hangers, once installed, should also be easily released and adjusted so that the supported pipes can be removed, replaced, have their pitch adjusted, and the like with a minimum of labor.

The subject invention is deemed to overcome the above-noted problems and meet these needs and others in a simple, economical manner.

SUMMARY OF THE INVENTION

In accordance with the present invention, there is provided a self-locking, easily produced and easily installed pipe hanger.

In accordance with a more limited aspect of the invention, a pipe receiving member adapted for hanging an associated pipe from an associated support structure includes a single loop of elastic wire having a configuration adapted to receive the assocaited pipe therein. First and second legs extend outwardly from a bight portion of the loop and each leg has means for engaging the other leg.

According to a further aspect of the invention, the first leg engaging means includes a first arcuate portion for operatively receiving the second leg therein.

According to yet another aspect of the invention, a first arcuate portion on the second leg operatively receives the first leg therein.

According to a still further aspect of the invention, an interconnecting means is adapted for receipt between respective second arcuate portions on the first and second legs.

The principal advantage of the invention is a reliable and secure pipe hanging assembly.

Another advantage of the invention resides in the self-locking feature provided by the unitary member.

Yet another advantage resides in the easy and labor efficient manufacture of the invention.

Still another advantage resides in the simplified installation of the device.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts. A preferred embodiment of which will be described in detail in this specification and illustrated in the accompanying drawings which form a part hereof, and wherein:

FIG. 1 is a side elevational view of the subject invention particularly illustrating the support of an associated pipe;

FIG. 2 is an exploded perspective view of the pipe hanger components illustrated in FIG. 1;

FIG. 3 is a cross-sectional view along the lines 3-3 of FIG. 1; and,

FIG. 4 is a top plan view of the unitary loop member in its normally open position.

DETAILED DESCRIPTION OF THE PREFERRED EMBODIMENT

Referring now to the drawings, wherein the showings are for purposes of illustrating the preferred embodiment of the invention only and not for purposes of limiting same, the FIGURES show a generally continuous, single loop member of elastic wire A operatively associated with an interconnecting member B. The interconnecting member, in turn, connects to a spacing member or hanger rod C for supporting a tubular member or pipe D from a supporting structure E. The supporting structure may be a mounting bracket or similar structure extending from a ceiling beam, floor joist or the like. The spacing member C is shown as an exteriorly ridged or threaded member having a first or upper end 10 operatively engaged with the supporting structure. A second or lower end 12 is received in the interconnecting member B.

The interconnecting member B includes an elongated cylindrical portion 14 having an interior smooth-walled region 16 that functions as a guide means as will become more apparent hereinbelow. An interior threaded region 18 is adapted for operative connection with the second end 12 of the spacing member. A generally radially outward extending flange 20 is defined at one end of the interconnecting member. The flange defines a shoulder or upper surface 22 having a generally planar conformation for reasons which will be described in greater detail below.

The unitary loop member A includes first and second legs 30, 32. The legs extend generally outwardly from a bight portion 34. The legs and bight portion define a generally U-shaped configuration adapted to receive a tubular member or pipe D therein. The outer end portions of the respective legs are noramlly spaced from one another in a non-engaging position (see FIG. 4). More specifically, the first leg includes a first arcuate region 36 that extends away from a plane generally defined by the bight portion and the first and second legs as shown in FIG. 4.

Similarly, a first arcuate portion 38 extends from the second leg 32. The arcuate portion 38 extends generally normally from the plane defined by the legs and bight portion in a direction opposite that the arcuate portion 36. In this manner, the arcuate portions 36, 38 of the legs 30, 32, respectively, are defined on opposite sides of the noted plane. Further, each of the first arcuate portions 36, 38 are preferably of generally semi-cylindrical configuration.

A second arcuate portion 46 is defined at the outermost end of the first leg 30. In like manner, a second arcuate portion 48 is defined at the outermost end of the second leg 32. The second arcuate portions 46, 48 define engaging means or hook ends having a generally U-shaped configuration. The first and second arcuate portions of each leg generally define a question mark configuration. A second arcuate portion of one leg is designed to receive the other leg therein and defines an engaging position as shown in FIGS. 1–3. More specifically, the second arcuate portion 46 of the first leg 30 extends around the second leg 32. The second arcuate portion 46 is adapted to engage the second leg at a region adjacent the merging area of the first arcuate portion 38 with the remainder of the second leg. The second arcuate portion 48 of the second leg is adapted to retainingly engage the first leg 30 at a region adjacent the merging area of the first arcuate portion 36 with the remainder of the first leg (FIG. 2).

The free state or non-engaging position of the wire loop member A is shown in FIG. 4. The following description details a preferred method of transforming the loop member from the non-engaging position to the engaging position of FIG. 2. The first and second legs are resiliently deformed so that the arcuate portions of the respective legs bypass one another as generally shown by the arrows. Typically, the first arcuate portion 36 is directed from its original position on one side of the plane defined by the legs and bight portion to the other side of the plane. The first arcuate portion 38 of the second leg is likewise directed from its original position on one side of the plane to the opposite side of the plane. The force necessary to accomplish this resilient deformation should, of course, not exceed the elastic limit of the wire loop material.

Once the second arcuate portions 46, 48 are pushed past one another, the legs 30, 32 are forced toward one another such that each second arcuate portion receives the opposed leg therein. For example, the second arcuate portion 46 of the first leg generally slides along the periphery of the first arcuate portion 38 of the second leg until it reaches the merging area of the first arcuate portion 38 with the remainder of the second leg. The engaging position of the wire loop A as a result of this procedure is clearly illustrated in FIGS. 1–3.

With particular reference to FIGS. 2 and 3, it is clearly evident that the first arcuate portions 36, 38 define a generally circular opening therebetween in the engaging position. The opening is adapted to receive the cylindrical portion 14 of the interconnecting member B therethrough. In fact, the opening has a predetermined dimension slightly greater than the exterior dimension of the cylindrical portion 14 yet less than the outer peripheral dimension of the radial flange 20. This dimensional relationship permits the interconnecting member to be freely received through the opening in a generally axial direction until the shoulder 22 abuttingly engages the wire loop member A. In this position, the interconnecting member can be freely rotated in the opening defined by the first arcuate portions.

Assembly of the pipe hanger proceeds as follows. The hanger rod C is threadedly connected to the supporting structure E. The wire loop member is positioned around a pipe D. If necessary, the legs 30, 32 may be spread apart to receive the pipe D therethrough. The engaging means defined by the second arcuate portions on each leg are positioned in the above-described manner.

Once the second arcuate portions 46, 48 have reatainingly hooked the opposite leg, the interconnecting member B, specifically cylindrical portion 14, is received in the opening defined by the first arcuate portions. The smooth-walled interior 16 guides the interconnecting member over the second end 12 of the hanger rod. Interior threads 18 engage the second end of the hanger rod and since the interconnecting member is freely rotated within the opening of the wire loop member, secure connection is provided between these components.

A knurled region 50 is advantageously provided on the exterior surface of cylindrical portion 14 (FIG. 1). This knurled region facilitates ease of manual grasping of the interconnecting member B. An installer of the pipe hanger can thereby easily rotate the interconnecting member relative to the loop member and hanger rod C to secure the components together or provide for vertical adjustment of the associated pipe.

The wire loop member A may also be rotated with respect to the interconnecting member to assist in angular alignment of the pipe D. The first arcuate portions 36, 38 cooperate with the shoulder 22 of the interconnecting member while the bight portion 34 supports the tubular member D therein. As is apparent in FIG. 1, the first arcuate portion 38 of the second leg abuttingly engages shoulder 22. The semicircular configuration of the arcuate portion 38 provides an adequate abutting surface for stable mating contact with shoulder 22.

The pipe hanger assembly provides a unitary wire loop member in which respective legs are adapted to interconnect with the opposing leg. This permits the wire loop to be positioned around the pipe and an installer's hands are thereafter free to position the interconnecting member B between the first arcuate portions 36, 38. The wire loop member provides support for the pipe and is adjustable both vertically and angularly with respect to the remainder of the supporting structure. Further, the wire or rod design of the loop member A is easily bent into its predetermined configuration. This, of course, reduces manufacturing costs and the simplified installation, in turn, reduces installation labor costs.

The invention has been described with reference to the preferred embodiment. Obviously, modifications and alterations will occur to others upon a reading and understanding of this specification. It is intended to include all such modifications and alterations insofar as they come within the scope of the apended claims or the equivalents thereof.

Having thus described the invention, it is now claimed:

1. A pipe hanger member adapted for hanging an associated pipe from an associated support structure, the pipe hanger member comprising:
a loop of wire having a central bight portion, first and second legs extending outwardly from opposed ends of the bight portion, the first leg including a hook end for receiving the second leg, the second leg including a hook end for receiving the first leg, the hook ends selectively interlocking the first leg to the second leg, the first and second legs being disposed in the same plane when the hook ends are in an unlocked, spaced position, the first and second legs being urged into different planes when the hook ends are in locking engagement with the legs, and the legs defining means for receiving an associated interconnecting means therethrough.

2. A pipe hanger member adapted for hanging an associated pipe from an associated support structure, the pipe hanger comprising:
a loop of wire having a central bight portion, first and second legs extending outwardly from opposed ends of the bight portion and adapted to be selectively locked together, the first leg including a hook end for selectively receiving the second leg, the second leg including a hook end for selectively receiving the first leg, arcuate regions on the first and second legs disposed adjacent the hook ends, the hook end on the first leg engaging the second leg at an area between its arcuate region and the remainder of the second leg, and the arcuate regions cooperating to receive an associated connecting means therethrough when the legs are interlocked together by the hook ends.

3. The pipe hanger member as defined in claim 2 wherein the hook end on the second leg engages the first leg at an area between its arcuate region and the remainder of the first leg.

4. The pipe hanger member as defined in claim 2 wherein the wire loop is a single, continuous member.

5. A pipe hanger member adapted for hanging an associated pipe from an associated support structure, the pipe hanger member comprising:
a loop of wire having a central bight portion, first and second legs extending outwardly from opposed ends of the bight portion, the first leg including a hook end at a terminal end thereof and a first arcuate region disposed adjacent the hook end, the second leg including a hook end at a terminal end thereof and a first arcuate region disposed adjacent the hook end, the hook end on the first leg engaging the second leg in an interlocked position at an area where the first arcuate region extends from the remainder of the second leg, and the hook end on the second leg engaging the first leg in an interlocked position at an area where the first arcuate region extends from the remainder of the first leg.

6. The pipe hanger member as defined in claim 5 wherein the wire loop is a single, continuous member.

7. The pipe hanger member as defined in claim 5 wherein the hook end of the first leg is defined by a bend of approximately 180°.

8. The pipe hanger member as defined in claim 7 wherein a terminus of the hook end on the first leg is turned outwardly from a plane defined by the remainder of the hook end.

9. The pipe hanger member as defined in claim 7 wherein the hook end on the second leg is defined by a bend of approximately 180°.

10. The pipe hanger member as defined in claim 7 wherein the first and second legs are defined in a common plane in a non-engaging position and are defined in diverging planes in an engaging position.

11. The pipe hanger member as defined in claim 7 wherein the first and second legs are defined in a common plane in a non-engaging position and the first arcuate regions extend generally normally from the common plane in opposite directions from one another.

12. A hanger assembly adapted for suspension from an associated support struture, the hanger assembly comprising:
an interconnecting member having a shoulder and means adapted for operatively connecting with the associated support structure; and
a loop of wire having a central bight portion, first and second legs extending outwardly from opposed ends of the bight portion, the first leg including a hook end for selectively engaging the second leg and a first arcuate region, the second leg including a hook end for selectively engaging the first leg and a first arcuate region, the first arcuate regions defining means for receiving the connecting means of the interconnecting member.

13. A hanger assembly adapted for suspension from an associated support structure, the hanger assembly comprising:
an interconnecting member having a shoulder and means adapted for operatively connecting with the associated support structure; and
a loop of wire having a central bight portion, first and second legs extending outwardly from opposed ends of the bight portion, the legs including means for selectively interlocking the first leg directly to the second leg, said legs defining means for receiving the connecting means of the interconnecting member when the legs are in an interlocking position.

14. The hanger assembly as defined in claim 13 wherein the wire loop is a single, continuous member.

15. The hanger assembly as defined in claim 13 wherein the receiving means is defined by first arcuate regions disposed on each leg.

16. The hanger assembly as defined in claim 15 wherein the legs define a common plane in the non-interlocking position and are in diverging planes in the interlocking position.

* * * * *